United States Patent
Bross et al.

(10) Patent No.: US 7,067,079 B2
(45) Date of Patent: Jun. 27, 2006

(54) EXTRUDED PLASTIC SCINTILLATOR INCLUDING INORGANIC POWDERS

(75) Inventors: Alan D. Bross, Downers Grove, IL (US); Kerry L. Mellott, Malta, IL (US); Anna Pla-Dalmau, Naperville, IL (US)

(73) Assignee: Universities Research Association, Inc., District of Columbia ( * ) Notice: Subject to any disclaimer, the term of this patent is extended or adjusted under 35 U.S.C. 154(b) by 508 days.

(21) Appl. No.: 10/308,786

(22) Filed: Dec. 3, 2002

(65) Prior Publication Data
US 2004/0104500 A1 Jun. 3, 2004

(51) Int. Cl.
*B29C 59/00* (2006.01)
*B29C 47/00* (2006.01)

(52) U.S. Cl. ................ 264/122; 264/109; 264/118; 264/176.1; 264/210.6

(58) Field of Classification Search ......... 264/109–128, 264/210.6
See application file for complete search history.

(56) References Cited

U.S. PATENT DOCUMENTS

| | | | |
|---|---|---|---|
| 5,514,870 A | 5/1996 | Langenbrunner | 250/367 |
| 5,714,761 A | 2/1998 | Fay | 250/367 |
| 5,968,425 A * | 10/1999 | Bross et al. | 264/21 |
| 6,087,656 A | 7/2000 | Kimmich et al. | 250/252.1 |
| 6,218,670 B1 | 4/2001 | Yun et al. | 250/370.11 |
| 6,359,282 B1 | 3/2002 | Sekela | 250/370.11 |
| 2002/0079459 A1 | 6/2002 | Dorscheid et al. | 250/370.11 |
| 2002/0102395 A1 | 9/2002 | Duclos | 428/297.4 |
| 2002/0131547 A1 | 9/2002 | Riedner et al. | 378/19 |
| 2002/0162965 A1 | 11/2002 | Okada et al. | 250/370.11 |

* cited by examiner

*Primary Examiner*—Stephen J. Lechert, Jr.
(74) *Attorney, Agent, or Firm*—Kermit D. Lopez; Luis M. Ortiz; Ortiz & Lopez

(57) ABSTRACT

A method for producing a plastic scintillator is disclosed. A plurality of nano-sized particles and one or more dopants can be combined with a plastic material for the formation of a plastic scintillator thereof. The nano-sized particles, the dopant and the plastic material can be combined within the dry inert atmosphere of an extruder to produce a reaction that results in the formation of a plastic scintillator thereof and the deposition of energy within the plastic scintillator, such that the plastic scintillator produces light signifying the detection of a radiative element. The nano-sized particles can be treated with an inert gas prior to processing the nano-sized particles, the dopant and the plastic material utilizing the extruder. The plastic scintillator can be a neutron-sensitive scintillator, x-ray sensitive scintillator and/or a scintillator for the detection of minimum ionizing particles.

16 Claims, 4 Drawing Sheets

EXTRUDED PLASTIC SCINTILLATOR INCLUDING INORGANIC POWDERS

STATEMENT OF GOVERNMENT INTEREST

The United States Government has rights in this invention pursuant to Contract No. DE-AC02-76CHO3000 between the U.S. Department of Energy and the University Research Association.

TECHNICAL FIELD

The present invention is generally related to scintillators utilized in the detection of radiation. The present invention is also related to improved methods and systems for plastic scintillator material and plastic scintillator devices thereof.

BACKGROUND OF THE INVENTION

Scintillators are well known in the radioactive detection arts. A scintillator is a material that converts energy into light. Energy is deposited into the scintillator by penetrating radiation. This energy is then converted into ultra-violet or visible light, which can then be detected with the use of a photo detector such as a photo multiplier tube. Generally, incident penetrating radiation includes high-energy particles and ionizing radiation such as x-rays, gamma rays, alpha particles, beta particles, thermal neutrons, etc.

Scintillators are therefore materials that emit flashes or pulses of light when ionizing radiation such as gamma rays interact with them. Plastic scintillators formed from an aromatic polymer such as polystyrene or polyvinyltoluene, for example, are particularly well suited for radiation detection applications. These materials are readily melt-processable and capable of being extruded into a variety of shapes and sizes to meet the spatial requirements of the detector involved.

A typical plastic scintillator is composed of a polymer matrix doped with two or more fluorescent organic compounds, a primary dopant and a secondary dopant. Solutions of a polymer and an efficient fluorescent dopant can give a system with close-to-unity quantum yield, a high-efficiency scintillator. The term quantum yield is defined as the probability that an excited state in the polymer leads to the emission of a photon by a dopant, which is generally an organic compound. In Forster's theory of nonradiative energy transfer between molecules in solution, the energy transfer is described by a dipole-dipole interaction in which nonradiative energy transfer occurs between the first excited π-singlet state of the solvent and the solute (i.e., dopant) in the ground state. The strength of this interaction is a function of the natural fluorescence lifetime of the solvent and the mean separation between the solvent and the solute molecule.

Fluorescence can be defined as the emission of a photon by a molecular transition from the molecule's first excited singlet state to its ground state. At high dopant concentrations (e.g. approximately 1% by weight), this process can dominate the emission or quenching process of the solvent. If the dopant's radiative quantum yield is close to unity, the number of photons emitted per solvent-molecule π-electron excitation can approach one even though the radiative quantum yield of the solvent is small (e.g., 0.07 in the case of polystyrene).

Dopants that couple to the primary excitation of the solvent are called primary dopants. The primary dopant serves to raise the photon yield of the solvent plus dopant(s) combination (the number of photons emitted per unit energy deposited in the solvent) and to shift the mean wavelength of the final fluorescence of the scintillator to longer wavelengths. The addition of secondary dopants, in low concentrations (e.g., approximately 0.01% to 0.2% by weight), to the binary system of solvent and primary dopant results in the shifting of the fluorescence wavelength further to the red portion of the spectrum. Secondary dopants do not increase the intrinsic photon yield of the scintillator. By shifting the fluorescence emission to a longer wavelength, however, more photons escape from the scintillator since self-absorption by the scintillator is reduced. The term "technical quantum yield" is often applied to scintillators of finite size. In this case, effects of self-absorption are included in the determination of quantum or detected photon yield of the scintillator.

The most commonly used polymer bases in plastic scintillator are polystyrene and polyvinyltoluene. Monomeric styrene is a liquid, which polymerizes on heating to form the solid plastic polystyrene. When doping of the polystyrene or some alternate polymer matrix, several methods are available including:

1. dissolving the dopant in molten polystyrene;
2. polymerizing a styrene-dopant solution at a low temperature (e.g., 50° C.) with a benzoyl peroxide catalyst;
3. polymerizing a styrene-dopant solution at a medium temperature (e.g., 125° C.–140° C.) over several days without a catalyst;
4. polymerizing a styrene-dopant solution at a high temperature (e.g., 200° C.) without a catalyst for a period approximately 12–15 hours.

The utilization of method 2 above may impair transparency and reduce the efficiency of the scintillator. The size of the plastic scintillator frequently dictates the production method used. For small samples, a monomer is generally subjected to numerous vacuum distillation processes to remove inhibitors. The monomer is then transferred to a vial containing the dopant. The vial is connected to a vacuum system, and the dissolved gas is removed by repeated freeze-pump-thaw cycles. The evacuated vial is sealed, shaken to insure the complete dissolution of the dopant in the monomer, and then placed in an oil bath at 125° C. for several days.

For larger specimens, a generally employed technique is to bubble nitrogen through the monomer to expel the oxygen and then mix in the dopant. The solution is then heated and the polymerization is carried out in a nitrogen atmosphere. For high temperature polymerization, the vacuum-distilled monomer and the dopant are placed in a reaction flask fitted with a reflux condenser and flushed with nitrogen for approximately thirty minutes after which the container is evacuated and sealed. The container is then heated in a bath to over 200degree. C. for a period of from eight to ten hours.

Typically, the technique for the preparation of plastic scintillators is:

1. purification of the monomer by vacuum distillation;
2. addition of dopants to monomer;
3. removal of dissolved gasses, notably oxygen;
4. complete polymerization in an inert atmosphere or under vacuum; and
5. careful annealing.

A variety of methods are known for producing plastic scintillators. In one method, for example, combining polystyrene pellets, which have been purged with an inert gas, with oil, and then mixing in the dopants can produce a plastic scintillator material. Mineral oil has been utilized with some success. Significantly better results, however, have been achieved when silicone oil was utilized as a plasticising agent to coat the polymer with dopant during mixing. The preferred silicone oil is an aromatic-substituted silicone. The pellet-oil-dopant combination is compounded or processed in an inert gas atmosphere, argon or nitrogen, to generate plastic scintillating material that can then be pelletized. These scintillator pellets can subsequently be extruded, injection molded and/or exposed to other plastic molding processes to form a scintillator piece of a particular shape or form. This process can also directly extrude scintillating fibers, sheet, or film from the melt, thus avoiding the pelletizing of the new scintillating plastic. By purging the initial polymer pellet stock with argon, the water and oxygen are driven out of the pellets. This and the subsequent use of argon or nitrogen in the processing of the mixture eliminate or reduce the need for a vacuum.

In another method for producing plastic scintillator material, the need for pre-mixing a polymer-pellet oil dopant combination can be eliminated by utilizing an inline coloring and compounding extrusion process. In this method the polymer pellets and all additives (dopants, silicone oil if desired, etc.) can be metered into the processing device and again a plastic scintillator material can be produced. The use of an inert gas purge can also be utilized in association with this method. Scintillator profiles, sheet, film, fiber can be directly produced by this method or the scintillator material can be pelletized for subsequent plastic forming operations.

The present inventors have developed a method for producing a plastic scintillator, which was disclosed in U.S. Pat. No. 5,968,425, "Methods for the Continuous Production of Plastic Scintillator Materials," which was issued to Bross et al on Oct. 19, 1999. U.S. Pat. No. 5,968,425 is directed toward methods for producing plastic scintillating material, including the use of silicone oil as a plasticising agent to uniformly and homogeneously coat the polymer with the dopants and then processing the mixture to mix the components at the molecular level. The invention disclosed in U.S. Pat. No. 5,968,425 also includes the implementation of an inert gas blanket (e.g., argon) with respect to the initial polymer and the combination of the polymer and the dopant during processing of the mixture to produce a plastic scintillating material. In the alternative, plastic scintillating material can also be produced by metering a dopant combination, a plurality of polymer pellets together with a regulated stream of inert gas, preferably argon, into a processing apparatus, usually a compounder. The polymer-dopant mixture disclosed in U.S. Pat. No. 5,968,425 can then be compounded in an inert gas atmosphere to produce a plastic scintillating material.

Although adequate for particular uses, the prior art discussed above, including the invention disclosed in U.S. Pat. No. 5,968,425, is limited in applicability and production efficiency. The prior art discussed above, for example, is not optimized for neutron detection or x-ray detection. Thus, the present inventors believe that a need exists for an improved scintillator, including fabrication methods thereof, which can be optimized for neutron detection or x-ray detection. Such improved methods can result in the production of scintillators optimized for neutron and/or x-ray detection and allows for systems of unparalleled performance for the detection of radiation, particularly radiation from nuclear material.

As will be explained, the methods and systems described herein allows for extremely large area scintillation detectors capable of detecting neutrons, x-rays, and minimum ionizing particles. While conventional scintillation detection technology might allow for detectors that are tens of $cm^2$ in area, the technology described herein allows for cost-effective detectors that are thousands of $m^2$ in area. The approaches described herein can provide up to $10^4$ times the sensitivity for detecting radiation from nuclear materials, thereby permitting faster scans of target materials while allowing for high-sensitivity scans at a much larger distance. The present inventors have thus developed an improved scintillator, including improved fabrication methods thereof.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide an improved scintillator for use in radiation detection.

It is yet another aspect of the present invention to provide an improved method for producing a plastic scintillator.

It is a further aspect of the present invention to provide a scintillator, which can be configured from nano-sized particles in the form of an inorganic powder.

It is still another aspect of the present invention to provide an improved scintillator, which can be optimized for neutron detection or x-ray detection.

The above and other aspects of the invention can be achieved as is now summarized. A method for producing a plastic scintillator is disclosed herein. A plurality of nano-sized particles and one or more dopants can be combined with a plastic material for the formation of a plastic scintillator thereof. The nano-sized particles, the dopant and the plastic material can be combined within the dry inert atmosphere of an extruder to produce a mix that results in the formation of a plastic scintillator thereof and the deposition of energy within the plastic scintillator, such that the plastic scintillator produces light signifying the detection of a radiative element. The nano-sized particles can be treated with an inert gas prior to processing the nano-sized particles, the dopant and the plastic material utilizing the extruder. The plastic scintillator can be a neutron-sensitive scintillator or x-ray sensitive scintillator.

According to the methods described herein, a neutron sensitive plastic scintillator incorporating nano-size (e.g., diameter<1 micron, but as small as 20 nm) lithium or boron-containing compounds can be produced. Lithium fluoride, lithium carbonate, and lithium titanate and boron oxide are examples of compounds that can be utilized in accordance with the methods described herein. The lithium and/or boron can be of natural isotopic abundance or enriched. Alternatively, an X-ray sensitive plastic scintillator incorporating nano-size (e.g., diameter<1 micron, but as small as 20 nm) heavy-element particles (e.g., $PbWO_4$) in polymer-based scintillator can be produced according to the methods described herein.

Compounding of additives into polymer pellets using single or twin-screw extruder is also provided, in addition to the production of extrusions with thin (e.g., <1 mm) cladding of neutron sensitive scintillator clad onto a core of undoped polymer. The present invention additionally discloses the fabrication of multiple layer detectors with individual layers being constructed from neutron and x-ray sensitive scintillator. Additionally, a cosmic-ray veto layer can be constructed as a minimum ionizing particle optimized (MIP-optimized) scintillator that functions in association with neutron and/or X-ray sensitive layers.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

Figure 1:
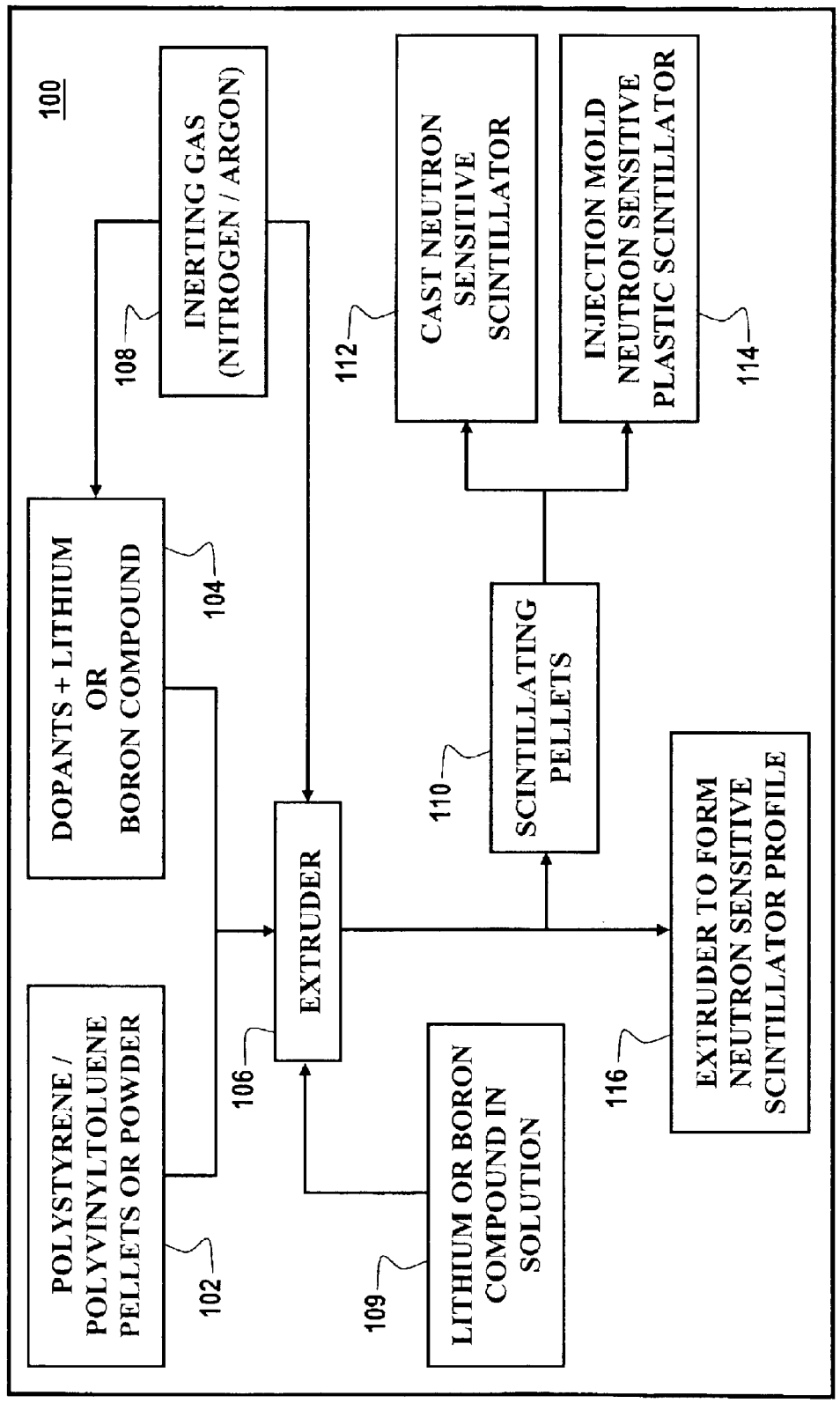
FIG. 1 illustrates a high-level flow chart depicting a fabrication process for a neutron-sensitive plastic scintillator, which can be implemented in accordance with a preferred embodiment of the present invention.

The particular values and configurations discussed in these non-limiting examples can be varied and are cited merely to illustrate an embodiment of the present invention and are not intended to limit the scope of the invention.

The present invention is directed toward an improved scintillator, which can be optimized for neutron detection or x-ray detection. Combinations of these types of scintillators can be utilized for the detection and identification of nuclear materials. The present invention is also directed toward methods for the production of neutron and/or x-ray sensitive polymer-based scintillators, in which the polymer can be, for example, an aromatic polymer such as polystyrene or polyvinyltoluene.

The neutron sensitive scintillator described herein can be produced by introducing a lithium or boron-containing compound into the scintillator. Neutron interactions with the lithium or boron produce ionizing particles that excite (i.e., transfer energy to) the polymer matrix. This excitation energy can then be transferred (e.g., Forster Transfer) to the scintillator primary dopant. A secondary dopant may also be utilized in the scintillator. This dopant absorbs light produced by the primary dopant and then reemits the light at longer wavelength (i.e., shifts the wavelength into the red). Detection of this light (i.e., either from the primary or from the secondary if a secondary is used) signals the neutron absorption event.

An x-ray enhanced scintillator can be produced in a similar manner, but in this case compounds containing high-Z (i.e., atomic number) elements are introduced into the polymer scintillator. X-ray absorption in this material is then dominated by interactions with these high-Z atoms (e.g., photoelectric effect), which produces a photoelectron that can excite the polymer matrix and thus produces light.

In both of these examples, the ionizing daughter particles from the neutron or x-ray interaction should interact with the polymer matrix.

The methodology disclosed herein introduces a neutron and/or x-ray sensitive components of the scintillator system in powder form. The process mixes these particles in the polymer matrix as opposed to introducing them via a chemical reaction. This powder does not go into solution in the polymer matrix in the conventional sense. The scintillator dopants (i.e., organic compounds), however, have high solubility in the polymer matrix and thus do go into solution. In order to produce an efficient scintillator, as much of the daughter particle energy as possible must be deposited into the polymer matrix.

If the particle size of the inorganic powder (e.g. neutron-sensitive compound or high-Z compound) is large compared to the range of the daughter particle (e.g., 5'40 micron for neutron interactions, 100 micron for x-ray interactions) the energy produced in the interaction is primarily deposited in the powder particle and not in the polymer matrix (i.e., scintillator). Therefore, very little light is produced. If the particle size is small compared to the range, most of the energy is deposited in the scintillator. The light produced in the scintillator can still be affected by the particle size of the powder.

Scattering of light by small particles is generally described by MIE theory and/or Rayleigh scattering, which are both well known in the art. If the scattering intensity is large, then the detection of the scintillation light will be made less efficient. The scattered light intensity as a function of position r from the scattering site and angle θ is described generally by equation (1) below:

$$I_S = 8 \cdot \pi^4 \cdot \frac{Na^6}{\lambda^4 \cdot r^2} \cdot \frac{(m^2-1)^2 \cdot (1+\cos^2\cdot\theta) \cdot I_i}{(m^2+2)^2} \quad (1)$$

Which when integrated over all r and θ becomes, as indicated in equation (2) below:

$$I_S \propto \frac{Na^6}{\lambda^4} \cdot \frac{(m^2-1)^2 \cdot I_i}{(m^2+2)^2} \quad (2)$$

The variable a represents the radius of the particle, and the variable N represents the number per unit volume in equations (1) and (2). Additionally the ratio m generally describes the ratio of the index of refraction of the particle to the index of refraction of the polymer, while the variable λ represents the wavelength of the incident and scattered light. The variable $1_s$ represents the intensity of the scattered light, and the variable $1_i$ represents the intensity of the incident light.

Two conclusions can be attained from equations (1) and (2). First, as the variable m goes to 1 (i.e., index of the particle equal to the index of the polymer) the intensity of the scattered light goes to zero. Also, for a fixed concentration of powder in the polymer or weight percent (e.g., fixed $Na^3$), the intensity of the scattered light goes as $a^3$. Therefore, the smaller the size of the particle in the inorganic powder, the smaller the intensity of the scattered light. For these reasons, it is desirable to work with a particle size as small as possible and attempt to match the index of refraction of the powder additive described herein as closely as possible to that of the polymer.

Nano-sized particles of a $^6$Li bearing compound can be configured for use with a neutron sensitive scintillator implemented in accordance with the present invention. Alternatively, a $^{10}$B bearing compound can be configured into polystyrene or another suitable plastic including dopants that make the plastic scintillate. The reactions, which are indicated below with respect to equations (3) or (4), deposit energy in the scintillator which, in turn, can produce light that is detected by a photo detector signifying the detection of a neutron.

$$n + {}^6Li \rightarrow {}^4He + {}^3H + 4.79 \text{ MeV} \quad (3)$$

$$n + {}^{10}B \rightarrow {}^7Li + {}^4He \rightarrow {}^7Li + {}^4He + 2.3 \text{ MeV} \quad (4)$$

The 6Li reaction (i.e., refer to equation (3) above) constitutes a preferable mode of detection for plastic scintillator applications because a greater amount of ionization energy is available for conversion into light. Additionally, due to the fact that the triton ($^3$H) possesses a longer range in the plastic scintillator matrix, a greater amount of light can be produced per unit of deposited energy. Suitable lithium compounds include, but are not limited to lithium fluoride, lithium titanate, and/or lithium carbonate. LiF is a particularly good candidate, because its index of refraction is 1.4 compared to 1.59 for polystyrene or poly-vinyl toluene. In the case of a $^{10}$B loaded plastic scintillator (i.e., see equation (4) above), $B_2O_3$ compounds are suitable. Lithium and boron compounds can respectively utilize lithium and boron with natural isotopic abundances or can be enriched with a neutron sensitive isotope and thus increase neutron capture sensitivity.

FIG. 1 illustrates a high-level flow chart 100 depicting a fabrication process for a neutron-sensitive plastic scintillator, which can be implemented in accordance with a preferred embodiment of the present invention. Critical points in the process are thus depicted with respect to blocks 102 to 116 in flow chart 100 of FIG. 1. As depicted at block 102, aromatic polymers such as polystyrene or polyvinyltoluene pellets or powder can be provided and processed in an extruder, as indicated at block 106. Additionally, as indicated at block 104, dopants and a lithium compound can be combined and then processed in the extruder, as indicated at block 106. Preparation of a lithium and/or a boron containing compound is crucial. The optimum particle size can generally be on the order of 20 nm. Particle sizes up to a few microns can be tolerated, but the scintillator performance, light output per absorbed neutron, can be degraded.

Because the lithium and boron compounds are hygroscopic, a drying and inerting gas (i.e., nitrogen or argon) can be utilized, as indicated at block 108. Completely dry lithium and/or boron compounds facilitate the mixing step. Alternately, the Lithium or Boron compound can be supplied in suspension in an appropriate solvent and introduced into the processing device as a liquid solution, as illustrated at block 109. Thus, as depicted at block 106, an extruder with an intensive mixing section can be utilized in order to uniformly distribute the lithium and/or boron compounds within the plastic matrix, which is described in greater detail herein. Intensive mixing is preferred in order to most uniformly distribute the Li/B compounds in the polymer matrix (i.e., melt) and in order to reduce their final particle size, i.e., break up agglomerates that may form in the compound prior to processing within the extruder depicted at block 106.

Primary and secondary dopants (e.g., fluorescent compounds) can be mixed with the Li/B compounds prior to processing in the extruder or introduced alone in the case of the Li/B compounds being introduced via suspension in a liquid injected into the extruder. Processing of the components in the extruder (i.e., polymer+Li/B+dopants) can be accomplished under a dry inert atmosphere. The resultant melt can be extruded into a neutron sensitive scintillator profile as depicted at block 116 or pelletized as illustrated at block 110 and thereafter utilized in subsequent casting as depicted at block 112, injection molding as indicated at block 114 or extrusion processes thereof.

Figure 2:
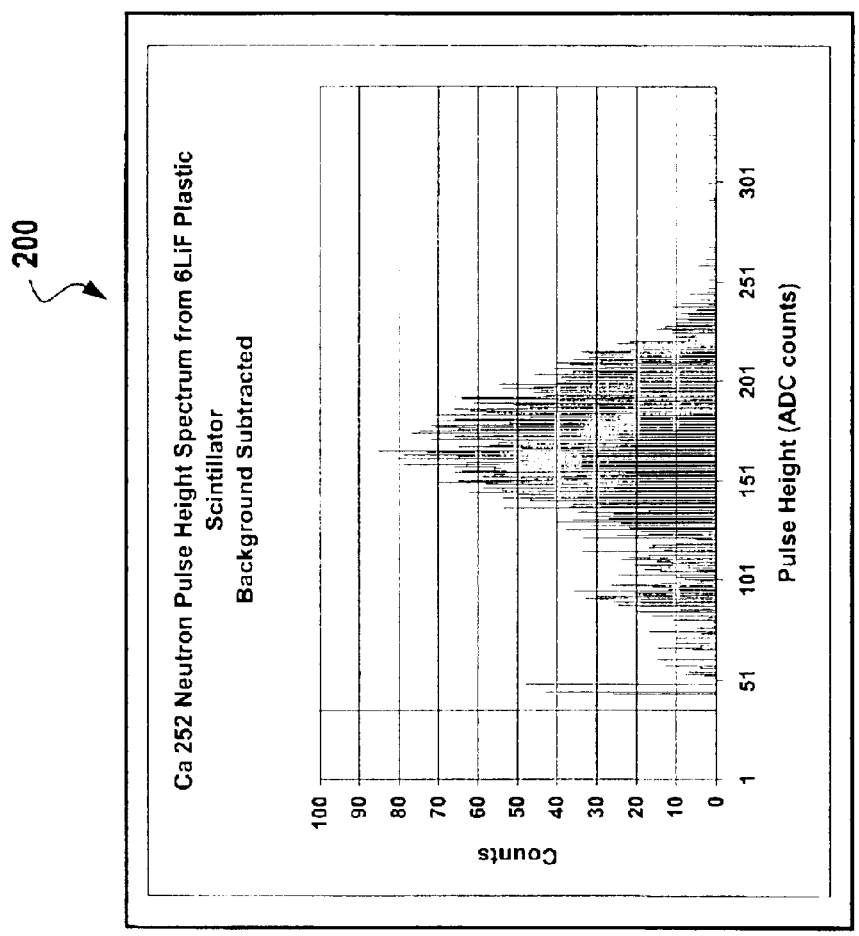
FIG. 2 depicts a graph depicting light yield (i.e., pulse height) from moderated $^{252}$Ca neutrons, in accordance with a preferred embodiment of the present invention.

FIG. 2 depicts a graph 200 depicting light yield (i.e., pulse height) from moderated $^{252}$Ca neutrons, in accordance with a preferred embodiment of the present invention. The light yield from a polystyrene+p-Terphenyl+DPS+$^6$LiF plastic scintillator can be measured. Example data are depicted in graph 200 of FIG. 2. As indicated in graph 200, one possible yield can be approximately 50% of a commercial ZnS(Ag) based neutron detector, but has approximately the same detection efficiency. It can be appreciated by those skilled in the art that the data depicted in graph 200 is presented for illustrative and edification purposes only and is not considered to be a limiting feature of the present invention.

Figure 3:
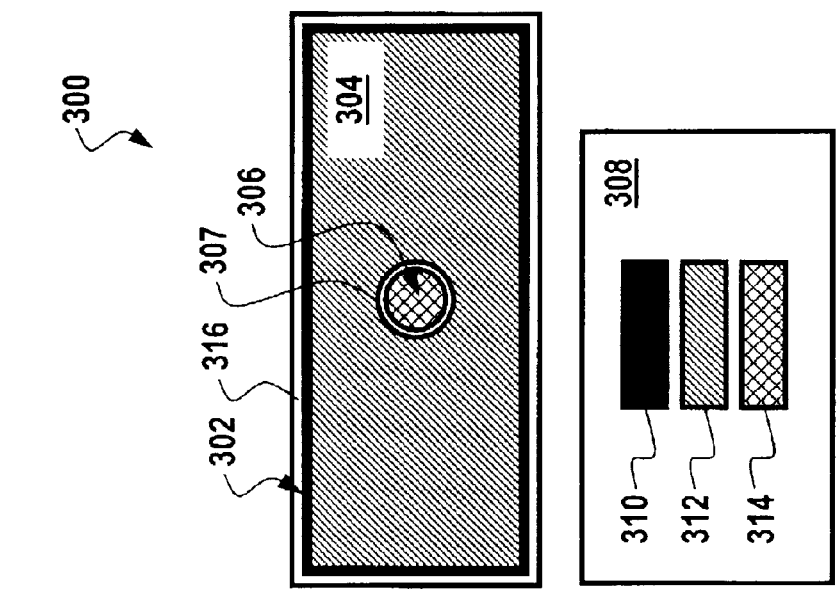
FIG. 3 illustrates a cross sectional view of an extrusion, which can be optimized to register detection of neutrons, in accordance with a preferred embodiment of the present invention.

FIG. 3 illustrates a cross-sectional view of an extrusion 300, which can be optimized to register detection of neutrons, in accordance with a preferred embodiment of the present invention. Often the detection of neutrons is accomplished in an environment that contains other types of ionizing or interacting (e.g., x-ray) background. The performance of a neutron detector is often measured against its ability to detect neutrons while simultaneously rejecting (i.e., or not registering) other types of radiation. Thus, a neutron-sensitive scintillator can be utilized in accordance with the extruded configuration depicted in FIG. 3 in order to accomplish this task.

The neutron reactions described above with respect to equations (3) and (4) and graph 200 have a common feature. The resultant ionizing species (e.g., alpha or triton particles) have a very small range in plastic. This means that they only travel a short distance (e.g., on the order of 5–10 microns for the alpha, 40–100 microns for the triton) in the plastic before they lose all their energy. Therefore, all of the scintillation light from the reaction can be produced in a very thin layer. It is almost impossible for an x-ray or ionizing particle (e.g., cosmic-ray muon) to produce the same amount of light in such a thin layer. Thus, a light threshold can be established under which no event is registered.

For the extrusion 300 depicted in FIG. 3, a thin layer 302 of neutron-sensitive scintillators can cover a non-active plastic core 304. A reflective coating 316 can also be placed about thin layer 302. Light from the scintillator(s) can be guided by the relatively large plastic core 304 to a hole 307 that is positioned in the middle of extrusion device 300. Hole 307 can contain a wavelength shifting (WLS) fiber 306. This WLS fiber 306 absorbs the scintillation light and then re-emits light at a longer wavelength. Some of this light is captured in the fiber 306 and piped to a detection device (not shown in FIG. 3). Note that in FIG. 3, a legend box 308 is illustrated, which indicates a neutron-sensitive scintillator (e.g., 40–500 micron thick) 310, a Cerenekov-light absorbing plastic light collector 312, and a wavelength shifting fiber 314, which identify respective regions of extrusion 300.

The plastic light collector (i.e., non-active plastic core 304) can also incorporate dyes that absorb light from Cerenkov radiation from ionizing particles while not absorbing light from the neutron scintillator. In this manner, the extrusion 300 maintains its detection efficiency for neutrons while further rejecting non-neutron originating events. The design of a system, which incorporates extrusion 300 is very flexible. The neutron scintillator light wavelength distribution can be tailored to match the absorption of the WLS fiber 306, while simultaneously not overlapping the Cerenkov light region. The extrusion technique allows for almost any shape, rectangular, triangular, multi-faceted, etc.

Figure 4:
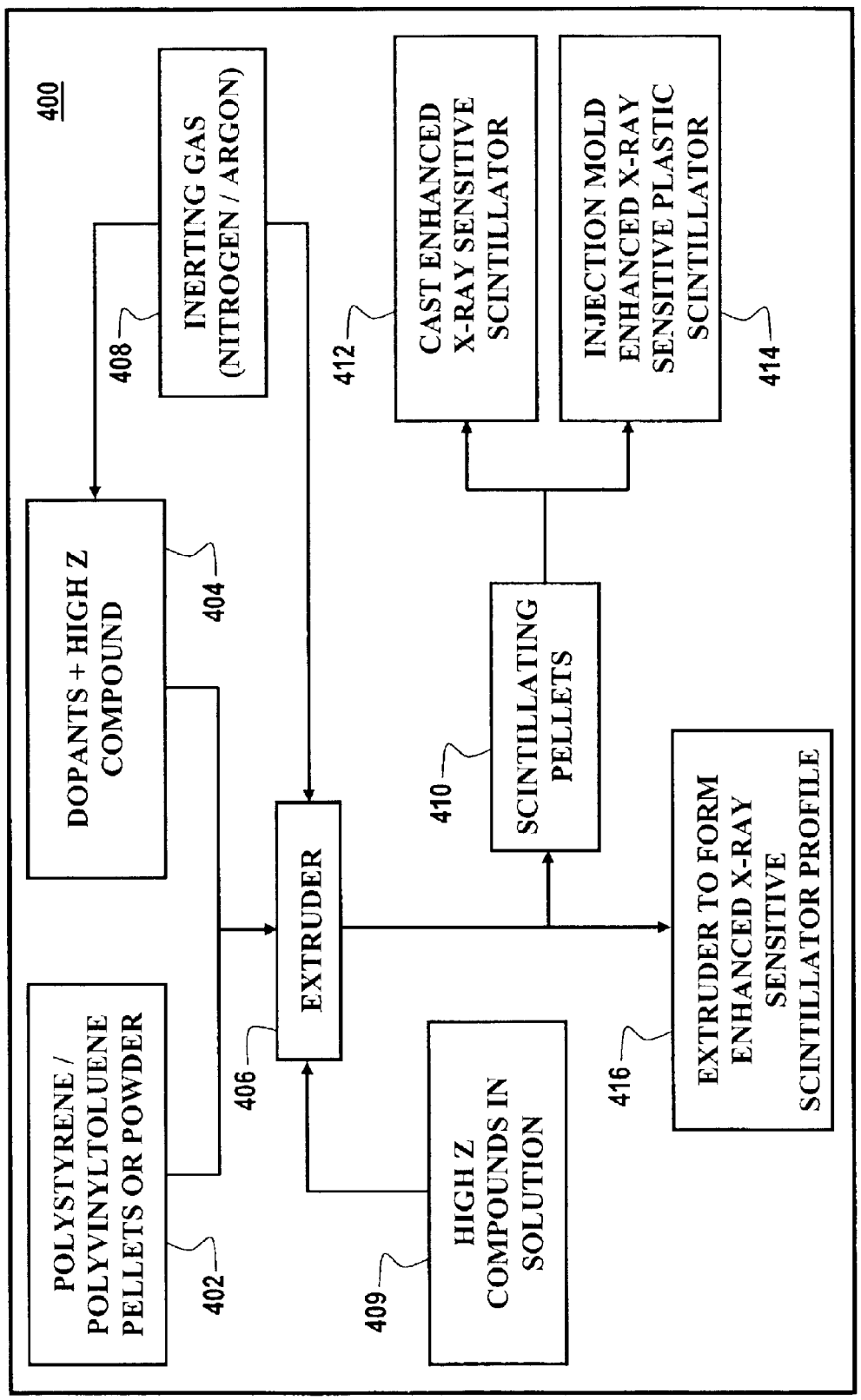
FIG. 4 depicts a flow process diagram for an x-ray enhanced sensitivity scintillator, in accordance with a preferred embodiment of the present invention.

FIG. 4 depicts a high-level flow chart 400 depicting a fabrication process for an x-ray enhanced sensitivity scintillator, in accordance with a preferred embodiment of the present invention. The flow process depicted in FIG. 4 is similar to the process utilized for the neutron-sensitive plastic scintillator, which was depicted and described earlier with respect to FIG. 1. X-ray sensitive scintillators generally should be thicker than scintillators utilized for neutron detection, because the stopping power of the scintillator (e.g., probability that an x-ray conversion occurs in the plastic) is dependent on the total amount of high-z element in the scintillator.

In order to get efficient x-ray stopping, a scintillator thickness of up to approximately 1 cm or more can be required depending on the x-ray energy. The heavy metal compound particle size should preferably be in a range of 10 nm to 1 micron in order to allow for proper light collection from samples having such a thickness. A scintillator configured in this manner can be extruded into virtually any shape. Typically, the light produced in the scintillator is collected by a wavelength-shifting (WLS) fiber. The light in the fiber can then be piped to a photo detector. An X-ray enhanced sensitivity scintillator can be produced by compounding heavy element nano-particles (e.g., $PbWO_4$, $PbO$, or $CeO_2$) into the plastic, along with dopants that make the plastic scintillate. X-rays interact with the heavy elements producing electrons that deposit energy in the scintillator, which in turn, can produce light.

Thus, as indicated at block 402, an aromatic polymer such as polystyrene or polyvinyltoluene pellets and/or powder can be provided to an extruder, which is depicted at block 406. Additionally, dopants and a high Z compound, as indicated at block 404, can be provided to the extruder, which is depicted at block 406. Alternately, the high Z compound can be supplied in solution in an appropriate solvent and introduced into the processing device as a liquid solution, as illustrated at block 409.

Because the high-Z compounds may be hygroscopic, a drying and inerting gas (i.e., nitrogen or argon) can be utilized, as indicated at block 408. Completely dry high-Z compounds facilitate the mixing step. The extrusion process thus can result in an enhanced x-ray sensitive scintillator profile, as depicted at block 416 and/or scintillating pellets, as depicted at block 410. The scintillating pellets can then be utilized in subsequent casting as depicted at block 412, injection molding as indicated at block 414 or extrusion processes thereof. An enhanced x-ray sensitive scintillator can be cast, as indicated at block 412. Alternatively, an enhanced x-ray sensitive scintillator can be injected molded, as illustrated at block 414.

Figure 5:
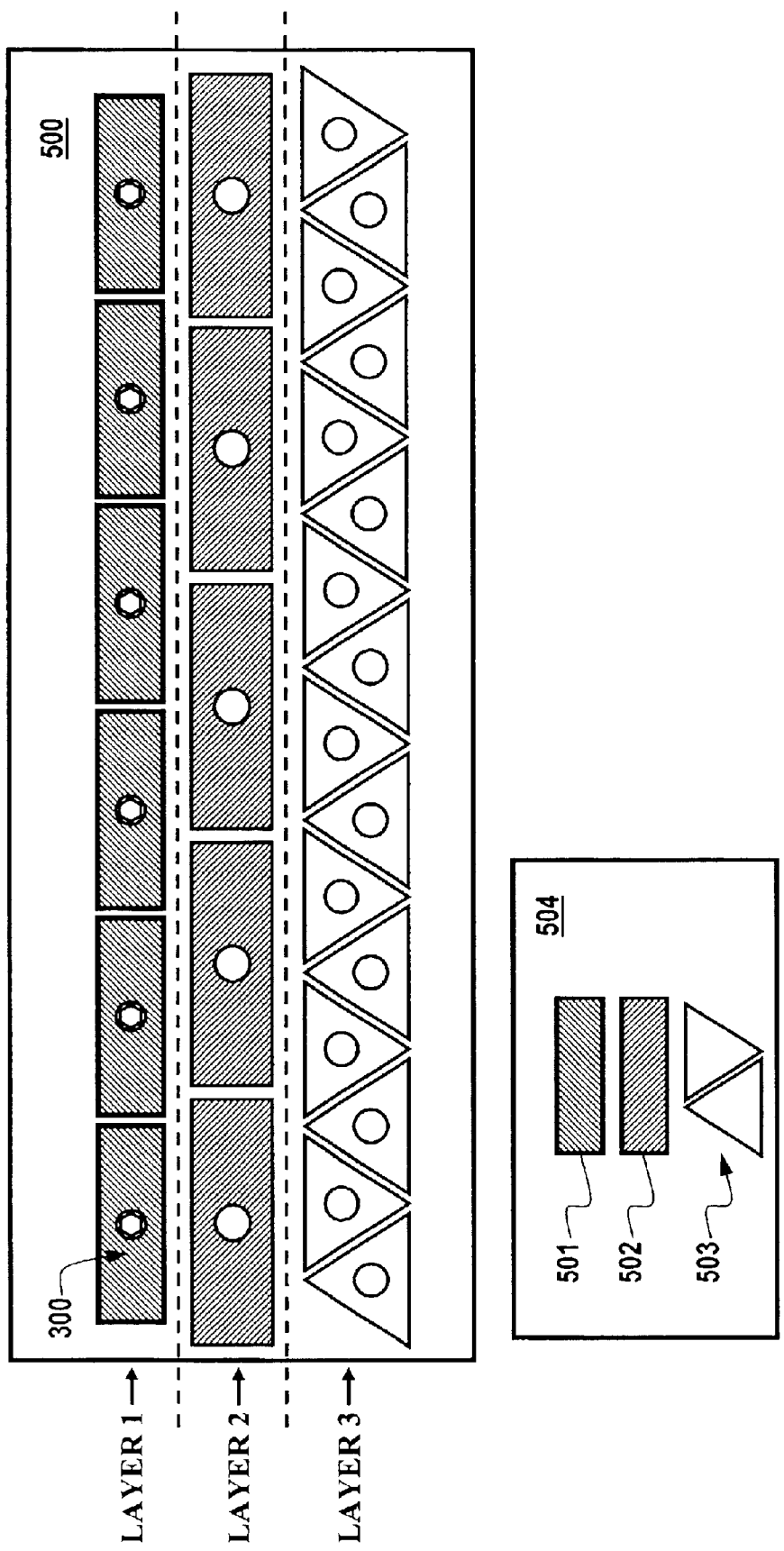
FIG. 5 illustrates a block diagram of an integrated radiation detection-identification system, which can be implemented in accordance with a preferred embodiment of the present invention.

FIG. 5 illustrates a block diagram of an integrated radiation detection-identification system 500, which can be implemented in accordance with a preferred embodiment of the present invention. Using the techniques described above, an integrated system can be configured that can detect and identify: neutrons, x-rays, and ionizing charged particles (e.g., cosmic-ray muons or minimum ionizing particles (MIPs)). System 500 can be utilized not only to detect the radiation, but also to identify or tag each detected species. Note that in FIGS. 3 and 5, like or analogous parts or elements are indicated by identical reference numerals. Thus, an extrusion 300 is shown in FIG. 5, which is analogous to the extrusion device 300 depicted in FIG. 3.

Three distinct layers are indicated in system 500, as indicated by legend box 504. System 500 includes a neutron-only sensitive scintillator layer 501, which is generally only sensitive to neutron interactions and therefore any event seen in this layer signals the detection of a neutron. Layer 501 is generally composed of a plurality of extrusions, such as extrusion 300. Note that as indicated in legend box 504, layer 501 (i.e., the first layer) is graphically represented by right-leaning hatched line, while layer 502 (i.e., the second layer) is indicated by a plurality of left-leaning hatched lines.

System 500 also includes an x-ray enhanced scintillator layer 502. As depicted in legend box 504, layer 503 (i.e., third layer) is generally indicated by opposing triangles. An event in layer 502 should not necessarily produce a corresponding event in layer 501, but would signal the detection of an x-ray. Layer 503 comprises a cosmic ray veto layer 503, which is composed of nested triangular extrusions that can be readout with a WLS fiber as in the other two cases described herein. Layer 503 does not possess, however, enhanced x-ray sensitivity.

A cosmic ray would often deposit energy in a triangular pair of layer 502. Two hits will then be produced. Two adjacent hits in layer 503 can signal the passage of a cosmic ray and can thereafter cause the rejection of an event that occurred simultaneously in layer 502. Note that Ionizing radiation can also produce events in the x-ray enhanced layer 502. Three classes of events can be summarized as follows:

1. A hit only in layer 501 indicates a neutron event.
2. A hit only in layer 502 indicates a high probability of x-ray event
3. Two hits in layer 503 indicate a cosmic-ray event.

A hit in layer 502 can also indicate a false x-ray hit, and the very small probability of hit in layer 501 may also indicate a false neutron event, which would indicate a "fake" or false reading when two hits are simultaneously seen in layer 503 as listed above with respect to event 3. The third layer (i.e., layer 503) can be utilized as a cosmic-ray veto because cosmic ray events would normally not be of interest in measurements searching for sources of nuclear radiation.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

For example, it can be appreciated by those skilled in the art that the plastic scintillator described herein can be formed from a variety of polymer types, including an aromatic polymer, an aliphatic polymer, an acrylic polymer, polystyrene plastic powder, polystyrene plastic pellets, polyvinyltoluene plastic powder; or polyvinyltoluene plastic pellets. In addition it can be appreciated by those skilled in the art that the plastic scintillator extrusions described herein for layers 501 and 502 can be of square or triangular cross section while those in layer 503 could be comprised of two layers of square or rectangular extrusions.

The description as set forth is therefore not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows.

Having thus described the invention what is claimed is:

1. A method for producing a plastic scintillator that is sensitive to neutrons or x-rays, said method comprising the steps of:
   combining a plurality of inorganic nano-sized particles and at least one dopant with a plastic material for the formation of a plastic scintillator thereof; and
   processing said plurality of inorganic nano-sized particles, said at least one dopant and said plastic material within a dry inert atmosphere of an extruder to produce a reaction that results in the formation of a plastic scintillator thereof and the deposition of energy within said plastic scintillator, wherein said plastic scintillator produces light signifying the detection of a radiative species comprising at least one neutron or at least one x-ray.

2. The method of claim 1 further comprising the step of:
   treating said plurality of inorganic nano-sized particles with an inert gas prior to processing said plurality of inorganic nano-sized particles, said at least one dopant and said plastic material utilizing said extruder.

3. The method of claim 1 wherein further comprising the step of:
   producing polymer pellets in response to processing said plurality of inorganic nano-sized particles, said at least one dopant and said plastic material within said dry inert atmosphere of said extruder.

4. The method of claim 3 wherein said extruder comprises a single screw extruder.

5. The method of claim 3 wherein said extruder comprises a twin screw extruder.

6. A method for producing a plastic scintillator, said method comprising the steps of:
   combining a plurality of nano-sized particles and at least one dopant with a plastic material for the formation of a plastic scintillator thereof, wherein said plurality of nano-sized particles comprises a lithium-bearing compound, wherein said lithium-bearing compound comprises at least one of the following: lithium fluoride, lithium titanate, or lithium carbonate; and
   processing said plurality of nano-sized particles, said at least one dopant and said plastic material within a dry inert atmosphere of an extruder to produce a reaction that results in the formation of a plastic scintillator thereof and the deposition of energy within said plastic scintillator, wherein said plastic scintillator produces light signifying the detection of a radiative species.

7. A method for producing a plastic scintillator, said method comprising the steps of:
   combining a plurality of nano-sized particles and at least one dopant with a plastic material for the formation of a plastic scintillator thereof, wherein said plurality of nano-sized particles comprises a boron-bearing compound, wherein said boron-bearing compound comprises $B_2O_3$; and
   processing said plurality of nano-sized particles, said at least one dopant and said plastic material within a dry inert atmosphere of an extruder to produce a reaction that results in the formation of a plastic scintillator thereof and the deposition of energy within said plastic scintillator, wherein said plastic scintillator produces light signifying the detection of a radiative species.

8. The method of claim 1 wherein said plastic material comprises a plastic powder.

9. The method of claim 1 wherein said plastic material comprises a plurality of plastic pellets.

10. A method for producing a plastic scintillator, said method comprising the steps of:
    combining a plurality of nano-sized particles and at least one dopant with a plastic material for the formation of a plastic scintillator thereof, wherein said plurality of nano-sized particles comprises a plurality of heavy element nano-sized particles comprising at least one of the following: $PbWO_4$ or $CeO_2$, wherein said plastic scintillator comprises an x-ray sensitive scintillator; and
    processing said plurality of nano-sized particles, said at least one dopant and said plastic material within a dry inert atmosphere of an extruder to produce a reaction that results in the formation of a plastic scintillator thereof and the deposition of energy within said plastic scintillator, wherein said plastic scintillator produces light signifying the detection of at least one x-ray.

11. A method for producing a plastic scintillator, said method comprising the step of
    combining a plurality of nano-sized particles and at least one dopant with a plastic material for the formation of a plastic scintillator thereof; and
    processing said plurality of nano-sized particles, said at least one dopant and said plastic material within a dry inert atmosphere of an extruder to produce a reaction that results in the formation of a plastic scintillator thereof and the deposition of energy within said plastic scintillator, wherein said plastic scintillator produces light signifying the detection of a radiative species, wherein said reaction comprises the following reaction:

$$n+{}^6Li \rightarrow {}^4He+{}^3H+4.79 \text{ MeV}.$$

12. A method for producing a plastic scintillator, said method comprising the step of
    combining a plurality of nano-sized particles and at least one dopant with a plastic material for the formation of a plastic scintillator thereof;
    processing said plurality of nano-sized particles, said at least one dopant and said plastic material within a dry inert atmosphere of an extruder to produce a reaction that results in the formation of a plastic scintillator thereof and the deposition of energy within said plastic scintillator, wherein said plastic scintillator produces light signifying the detection of a radiative species, wherein said reaction comprises the following reaction:

$$n+{}^{10}B \rightarrow {}^7Li^*+{}^4He \rightarrow {}^7Li+{}^4He+2.3 \text{ MeV}.$$

13. A method for producing a plastic scintillator that is sensitive to neutrons or x-rays, said method comprising the steps of:
    combining a plurality of nano-sized inorganic particles and at least one dopant with a plastic material for the formation of a plastic scintillator thereof;
    processing said plurality of nano-sized inorganic particles, said at least one dopant and said plastic material within a dry inert atmosphere of an extruder to produce a reaction that results in the formation of a plastic scintillator thereof and the deposition of energy within said plastic scintillator, wherein said plastic scintillator produces light signifying the detection of a radiative species comprising at least one neutron or at least one x-ray;

treating said plurality of nano-sized inorganic particles with an inert gas prior to processing said plurality of nano-sized inorganic particles, said at least one dopant and said plastic material utilizing said extruder; and producing polymer pellets in response to processing said plurality of nano-sized inorganic particles, said at least one dopant and said plastic material within said dry inert atmosphere of said extruder.

14. A method for producing a plastic scintillator, said method comprising the steps of:

providing a plastic and a plurality of nano-sized inorganic particles, wherein each of said nano-sized inorganic particles possess a size on the order of approximately 10 nm to −100 nm;

treating said plurality of nano-sized inorganic particles with an inert gas to produce completely dry nano-sized particles;

mixing said plurality of nano-sized inorganic particles with primary and secondary dopants prior to extruding said plastic; and extruding said plurality of nano-sized inorganic particles and said plastic within an extruder under a dry inert atmosphere in order to uniformly distribute said plurality of nano-sized inorganic particles within a plastic matrix associated with said plastic to form a resulting melt thereof which can be formed into a plastic scintillator thereof.

15. The method of claim 14 further comprising the step of providing said plastic in a form of at least one of the following:

aromatic polymer;

aliphatic polymer;

acrylic polymer;

polystyrene plastic powder;

polystyrene plastic pellets;

polyvinyltoluene plastic powder; or polyvinyltoluene plastic pellets.

16. The method of claim 14 further comprising the steps of:

extruding said resulting melt into a plastic scintillator profile; and pelletizing said resulting melt for use in subsequent casting, injection molding or extrusion processes thereof.

* * * * *